United States Patent [19]
Harris

[11] Patent Number: 5,403,557
[45] Date of Patent: Apr. 4, 1995

[54] EMISSION CONTROL APPARATUS FOR DIESEL ENGINE

[76] Inventor: Harold L. Harris, 11911 Fork Creek Dr., Houston, Tex. 77065

[21] Appl. No.: 229,798

[22] Filed: Apr. 19, 1994

[51] Int. Cl.⁶ .............. B01D 53/24; B01D 53/36; B04C 3/06; F01N 3/10
[52] U.S. Cl. .................... 422/169; 55/276; 55/337; 55/455; 55/DIG. 30; 60/297; 60/299; 181/264; 422/176; 422/217; 422/220
[58] Field of Search ............... 422/169, 171, 176, 180, 422/217, 222, 220; 60/297, 299, 302, 311; 55/276, 331, 337, 345, 347, 348, 455, DIG. 14, DIG. 30; 95/34, 269; 181/264, 268

[56] References Cited

U.S. PATENT DOCUMENTS

| | | | |
|---|---|---|---|
| 2,709,501 | 5/1955 | Toth et al. | 55/455 X |
| 3,372,532 | 3/1968 | Campbell | 55/455 X |
| 4,325,460 | 4/1982 | Hoppenstedt | 55/276 X |
| 5,149,346 | 9/1992 | Skruch et al. | 55/455 X |
| 5,196,654 | 3/1993 | Diflora et al. | 181/264 X |

*Primary Examiner*—Robert J. Warden
*Assistant Examiner*—L. M. Crawford
*Attorney, Agent, or Firm*—Bill B. Berryhill

[57] ABSTRACT

Improved emission control apparatus for use with a diesel engine which may include an enclosed cylindrical housing having an inlet and an outlet. A particulate trap is disposed in the housing between the inlet and outlet for collection and removal of particulates from the engine exhaust. The particulate trap includes an upstream section of reduced diameter and a downstream section of a diameter greater than the cylindrical housing to form an annular pocket therearound. The upstream section is provided with peripheral walls in which are provided uniformly spaced, longitudinally disposed, slotted apertures.

23 Claims, 1 Drawing Sheet

EMISSION CONTROL APPARATUS FOR DIESEL ENGINE

BACKGROUND OF THE INVENTION

1. Field of the Invention

The present invention pertains to apparatus for controlling emissions from internal combustion engines. More specifically, the present invention pertains to emission control apparatus particularly suitable for diesel fueled engines for removal of particulates therefrom. Specifically, the present invention pertains to emission control apparatus, primarily for removing particulates from the exhaust of a diesel engine but also for reduction of noise and/or noxious gases emitted therefrom.

2. Brief Description of the Prior Art

Noise reduction apparatus for internal combustion engines has existed for many years. Sometimes called silencers or mufflers, such noise reduction apparatus typically includes a housing the inlet of which is connected to the exhaust of an internal combustion engine and in which is provided various types of baffles or other silencing components for reduction of the noise produced at the exhaust of the internal combustion engine.

In more recent years, emission control apparatus has included, in addition to noise reduction components, components for reducing unwanted emissions from the exhaust of an internal combustion engine, e.g. noxious components such as nitrogen oxide, carbon monoxide and other unburned hydrocarbons. Increased regulation by state and federal authorities have demanded continued improvement in this area.

One of the most effective means for reducing noxious emissions from engine exhaust appears to be the utilization of some type of catalyst to convert the noxious gasses to water, nitrogen, carbon dioxide and other less noxious compounds. Emission control apparatus, manufactured in recent years, in which the functions of noise reduction and noxious gas reduction are combined in a single device or apparatus may be seen in U.S. Pat. Nos. 4,209,493; 4,601,168 and 5,016,438.

The burning of diesel fuel in diesel engines or diesel/gas engines results in exhaust in which, in addition to noxious gases such as nitrogen oxide, carbon monoxide and other unburned hydrocarbons, there are substantial amounts of smoke and/or particulates. While the combination emission control apparatus for reduction of noise and noxious gases, such as those previously mentioned herein, may be effective in reducing noise and noxious gases emitted with the exhaust of the diesel engine, they may not be effective in removing or reducing particulates therefrom. Furthermore, the particulates in the exhaust of a diesel engine may reduce the effectiveness of noise reduction and noxious gas reduction components of emission control apparatus by coating various surfaces thereof, i.e. catalytic cells for reduction of noxious gases. Since there is continued need and regulatory pressure for reduction of particulates in the exhaust of diesel engines, improved emission control apparatus for such purposes is desired.

SUMMARY OF THE INVENTION

The present invention provides emission control apparatus, primarily for use with a diesel engine, for removing at least a portion of the particulates therein. Disposed in the housing between the inlet and outlet thereof is a particulate trap for collection and removal of particulates in the engine exhaust prior to exit through the housing outlet. The particulate trap includes an upstream section having a diameters less than the diameter of the cylindrical housing and a downstream section having a diameter greater than the cylindrical housing forming an annular pocket therearound. The upstream section may have a closed upstream end and an open downstream end connected by peripheral walls which are provided therein with uniformly spaced, longitudinally disposed, slotted apertures. In a preferred embodiment radially inwardly directed fins are provided along one edge of the slotted apertures and are uniformly slanted, in the same direction, to aid in imparting centrifugal motion to the engine exhaust as it flows through the particulate trap. Such centrifugal motion forces and traps particulates in the annular pocket of the downstream section of the particulate trap. In a preferred embodiment of the invention, the particulate trap includes at least one section, the peripheral walls of which define the frustum of a cone and which provide for transitional flow of engine exhaust between upstream sections of the housing and the larger diameter downstream section of the particulate trap.

In alternate embodiments of the invention, the emission control apparatus includes a catalytic cell downstream of the particulate trap for reducing noxious gases in engine exhaust and/or noise reduction components downstream of the particulate trap for reducing noise emitted from the engine. Thus, the emission control apparatus of the present invention provides, in the same apparatus, removal of particulates and reduction of noxious gases and/or noise from the exhaust of a diesel or diesel/gas engine. This is done effectively and efficiently. A single housing is provided so that components which are normally duplicated in systems utilizing separate control devices are combined for common usage. Installation and maintenance cost are reduced. Pressure drop is reduced. Therefore energy loss is reduced and fuel is saved. Most importantly, reduction of particulates, noxious gases and noise from a diesel or diesel/gas engine are enhanced. Many other objects and advantages of the invention will be apparent from reading the description which follows in conjunction with the accompanying drawings.

Description of a Preferred Embodiment

Figure 1:
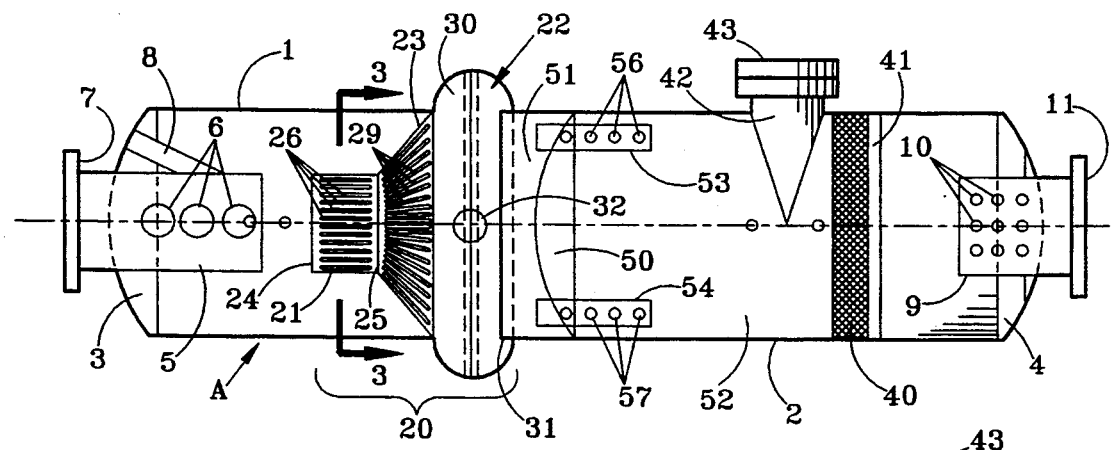
FIG. 1 is a longitudinal view, in section, of emission control apparatus for reduction of particulates, noxious gases and noise from the exhaust of a diesel or a diesel/gas engine, according to a preferred embodiment of the invention.

Referring first to FIG. 1, there is shown emission control apparatus A which includes a cylindrical housing of two sections, an inlet section 1 and an outlet section 2. The ends of the housing are closed by convex, concave head members 3 and 4. Providing an inlet into the inlet section 1 is a tubular inlet member 5 the walls of which may be provided with a plurality of perforations or holes 6 and the outer ends of which may be provided with a flange member 7 for connection to exhaust piping of a diesel or diesel/gas engine (not shown). Structural support members 8 may be provided to anchor the tubular member 5 in place. Providing an outlet for the outlet section 2 of the housing is a tubular member 9 the walls of which may be perforated by a plurality of holes or apertures 10. A flange member 11 may be provided for attachment of the outlet to exhaust piping (not shown). The holes or apertures 6 in the inlet tubular member 5 and outlet tubular member 9 contribute to the reduction of noise in the apparatus A. The number, size and location of these apertures 6,10 are determined by the characteristics of the engine with which the apparatus A is to be used so as to provide maximum amount of noise reduction.

Disposed in the housing and actually connecting the upstream and downstream sections 1,2 thereof, is a particulate trap 20 for trapping and removing of at least some of the particulates in the exhaust of the diesel or diesel/gas engine with which the apparatus A is to be used. The particulate trap 20 includes a generally cylindrical upstream section 21, a downstream section 22 and an intermediate section 23.

Figure 3:
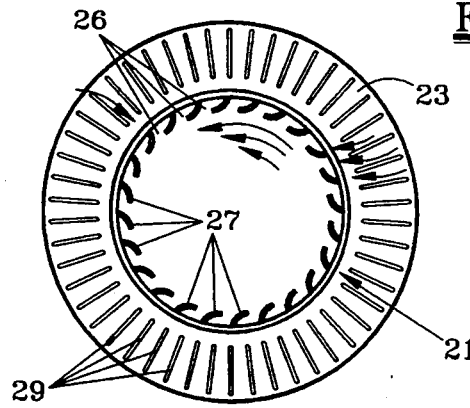
FIG. 3 is a cross-sectional view of a portion of the particulate trap components of the improved emission control apparatus of FIG. 1, taken along lines 3—3 thereof.

The upstream section 21 of the particulate trap 20 has a closed upstream end 24 and an opened downstream end 25 connected by peripheral walls in which are provided uniformly spaced longitudinally disposed slotted apertures 26. In a preferred embodiment of the invention, as best seen in FIG. 3, these apertures 26 are provided along one edge thereof with radially, inwardly directed fins 27 uniformly positioned to impart centrifugal motion to exhaust gases passing from the inlet section 1 of the cylindrical housing through the slotted apertures 26, the gases passing through the inlet tube 5 through the annular space surrounding the upstream section 21 then through the slotted apertures 26, as illustrated by the flow arrows in FIG. 3.

The intermediate section 23 of the particulate trap 20, as shown in FIG. 1, is provided with peripheral walls which define the frustum of a cone so as to provide transitional flow of engine exhaust between the smaller diameter upstream section 21 and the larger diameter downstream section 22 of the particulate trap 20. If desired, the peripheral walls of the intermediate section 23 may also be provided with uniformly spaced longitudinally disposed slotted apertures 29 to aid in imparting centrifugal motion to the engine exhaust passing through the particulate trap 20. These slotted apertures 29 may also be provided along one edge thereof with radially inwardly directed fins (not shown) positioned as the fins 27 in the upstream section 21, as best seen in FIG. 3.

As the exhaust gases, and the particulates therein, are placed in centrifugal motion by the upstream and intermediate sections 21 and 23, the particulates therein are centrifugally forced outwardly into the annular pocket 30 formed around the interior of the enlarged diameter downstream section 22 of the particulate trap 20. Due to centrifugal force and gravity, and the fact that the upstream end of the downstream section 2 of the cylindrical housing partially extends into this annular pocket 30 to form a barrier 31, these particulates tend to collect in the annular pocket 30. A cleanout port 32 may be provided to allow removal of particulates trapped therein.

Transversely disposed in the downstream section 2 of the housing is a catalytic cell 40 centrally supported therein by plurality of radial support members 41 which may be welded or bolted to the inside walls of the downstream housing section 2 to support the cell 40 against stress and pressure from backfire, explosions, etc. Such catalytic cells 40 are normally made of metallic substances and compounds which are effective in converting nitrogen oxide, carbon monoxide and other unburned hydrocarbons to nitrogen, carbon dioxide, water and other harmless products.

Welded to one side of the downstream housing section 2 is an elongated portal 42, a transverse opening of which is closed by closure member 43. The closure member 43 may be removed to permit removal and replacement of the catalytic cell 40.

In the preferred embodiment of the invention shown in FIG. 1, additional noise reduction components are disposed in the downstream housing section 2 between the particulate trap 30 and the catalytic cell 40. These noise reduction components include a convex, concave partition 50 separating the downstream housing section 2 into a first chamber 51 and a second chamber 52. The convex side of the convex-concave partition 50 preferably faces upstream. Penetrating the partition 50 and providing flow communication between the first and second chambers 51,52, respectively, are a plurality of open-ended tubular members 53,54 the walls of which are perforated as at 56 and 57 and the axes of which are parallel to the central axis of the cylindrical housing 1,2. The number of tubular members 53,54 and the number, size and location of apertures 56,57 therein, are determined by the characteristics of the diesel or diesel/gas engine with which the apparatus A is to be used. These are sized to reduce, as much as possible, noise from the engine exhaust.

Figure 2:
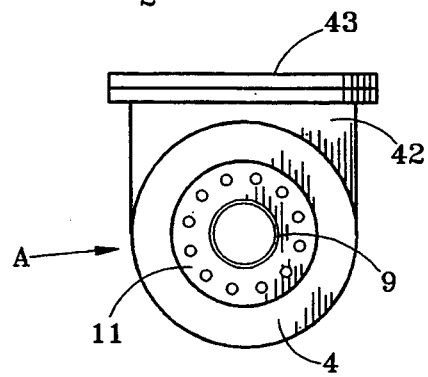
FIG. 2 is an end view of the improved emission control apparatus of FIG. 1.
Figure 4:
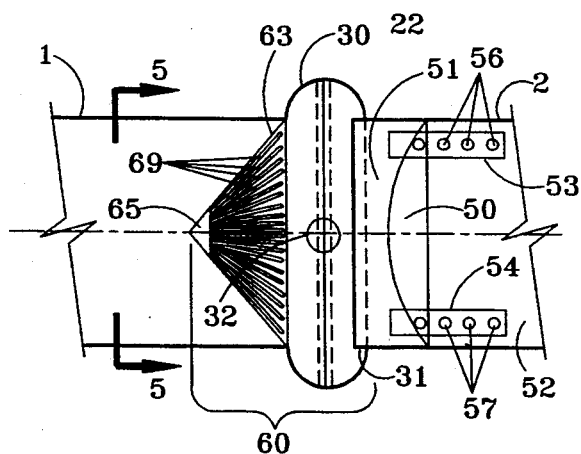
FIG. 4 is a longitudinal view, in section, of a portion of improved emission control apparatus for a diesel or a diesel/gas engine, according to an alternate embodiment of the invention.
Figure 5:
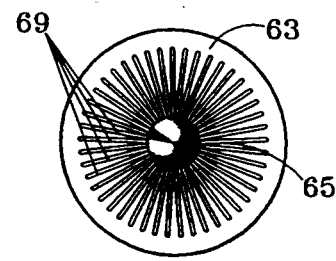
FIG. 5 is a cross-sectional view of a portion of the emission control apparatus of FIG. 4, taken along lines 5—5 thereof.

FIG. 4 and 5 illustrate an alternate embodiment of the invention in which the particulate trap 60, corresponding with the particulate trap 20 of the embodiment of FIGS. 1-3, does not have a cylindrical upstream section. The particulate trap 60 includes an upstream section 63 and a downstream section 30. The downstream section 30 of the particulate trap 60 is identical to the downstream section 30 of FIGS 1-3. For this reason, reference numbers used therewith are the same. Incidentally, all other components of the emission control apparatus A, including the inlet section 1, and outlet section 2 may be identical to the embodiment of FIGS 1—3 and the same reference numbers are used to designated like components.

The upstream section 63 of the particulate trap 60 is similar to the intermediate section 23 of the embodiment of FIGS 1-3. Its peripheral walls define the frustum of a cone. The walls are provided with uniformly spaced slots 69 which begin near a conical nose 65 and extend and flair outwardly to near the downstream section 22 of the particulate trap 60. These apertures 69 may be provided along one edge thereof with inwardly directed fins (not shown), such as the fins 27 of the upstream section 21 shown in FIG. 3, to impart centrifugal motion to exhaust gases passing from the inlet section 1 of the housing through the slotted apertures 69.

Like in the embodiment of FIGS 1-3, the exhaust gases, and the particulate therein, are centrifugally forced outwardly into the annular pocket 30 formed around the interior of the enlarged diameter downstream section 22 of the particulate trap 60 where they may eventually be removed through cleanout port 32.

Thus, the improved emission control apparatus of the present invention provides a particulate trap in which centrifugal motion is imparted to particulates in the exhaust of an engine, so that the particulates are forced into and trapped for eventual removal from the apparatus. In some embodiments of the invention, the emission control apparatus also includes noxious gas reduction components and/or noise reduction components. The resulting apparatus is extremely effective and efficient in removing particulates and noxious gases from the exhaust of a diesel or diesel/gas engine and for abating noise therefrom. All this may be accomplished in a single, unified compact device. While two embodiments of the invention have been described herein, it is obvious that many variations of the invention can be made without departing from the spirit of the invention. Accordingly, it is intended that the scope of the invention be limited only by the claims which follow.

I claim:

1. An emission control apparatus for use with a diesel engine including an enclosed cylindrical housing having an inlet at one end thereof for connection with the exhaust of said engine and an outlet at the opposite end thereof, wherein the improvement comprises a particulate trap disposed in said housing between said inlet and said outlet for collection and removal of particulates from said engine exhaust prior to exit through said outlet, said particulate trap comprising an upstream section having a diameters less than the diameter of said cylindrical housing and a downstream section having a diameter greater than said cylindrical housing to form an annular pocket therearound, said upstream section having a closed upstream end and an open downstream end connected by peripheral walls, said peripheral walls having uniformly spaced, longitudinally disposed, slotted apertures therein to impart centrifugal motion to said engine exhaust as said exhaust passes through said housing so that at least some of the particulates therein are forced outwardly by centrifugal force to be trapped in said annular pocket of said downstream section.

2. The improved emission control apparatus of claim 1 in which said particulate trap includes an intermediate section, the peripheral walls of which define the frustum of a cone and which provide for transitional flow of said engine exhaust between said upstream section and said larger diameter downstream section.

3. The improved emission control apparatus of claim 2 in which said peripheral walls of said intermediate section also have uniformly spaced longitudinally disposed, slotted apertures therein to impart centrifugal motion to said engine exhaust to aid in centrifugally forcing and trapping particulates in said annular pocket of said downstream section.

4. The improved emission control apparatus of claim 3 in which the slotted apertures of at least one of said upstream and said intermediate section are provided along one edge thereof with radially inwardly directed fins uniformly positioned to impart said centrifugal motion to said engine exhaust.

5. The improved emission control apparatus of claim 4 in which each of said fins is slanted, in the same direction, toward adjacent fins to aid in imparting said centrifugal motion to said engine exhaust.

6. The improved emission control apparatus of claim 1 in which said peripheral walls of said upstream section form a cylindrical cage surrounded by an annular space outwardly defined by the walls of said cylindrical housing, said engine exhaust passing from said inlet, through said annular space, then through said slotted apertures toward said downstream section of said particulate trap.

7. The improved emission control apparatus of claim 6 in which said slotted apertures of said upstream section are provided along one edge thereof with radially inwardly directed fins uniformly positioned to impart said centrifugal motion to said engine exhaust.

8. The improved emission control apparatus of claim 7 in which each of said fins is slanted in the same direction, toward adjoining fins, to aid in imparting said centrifugal motion to said engine exhaust.

9. The improved emission control apparatus of claim 1 in which said annular pocket of said downstream section of said particulate trap is provided with at least one port which may be opened to allow removal of particulates trapped therein.

10. The improved emission control apparatus of claim 1 in which said downstream section of said particulate trap also serves to connect upstream and downstream cylindrical sections of said cylindrical housing.

11. The improved emission control apparatus of claim 10 in which the upstream end of said downstream cylindrical section of said cylindrical housing partially extends into said annular pocket to form a barrier to particulates which may tend to exit said pocket in a downstream direction.

12. The improved emission control apparatus of claim 1 including a catalytic cell transversely disposed in said housing downstream of said particulate trap for reducing noxious gases in said engine exhaust by converting nitrogen oxide, carbon monoxides and unburned hydrocarbons to less noxious compounds prior to discharge through said outlet.

13. The improved emission control apparatus of claim 12 including portal means attached to said housing having an elongated portal transversely disposed relative to the axis of said housing and closed by a closure member which is removable to permit removal and replacement of said catalytic cell.

14. The improved emission control apparatus of claim 12 including noise reduction means disposed in said housing downstream of said particulate trap for reducing noise emitted from said engine.

15. The improved emission control apparatus of claim 14 in which said noise reduction means includes a plurality of open ended tubular members the walls of which are perforated and the axes of which are parallel to the central axis of said cylindrical housing.

16. The improved emission control apparatus of claim 15 in which said noise reduction means includes a convex-concave partition separating the portion of said housing downstream of said particulate trap into a first chamber and a second chamber, said tubular members penetrating said convex-concave partition providing flow communication between said first and second chambers.

17. The improved emission control apparatus of claim 1 including noise reduction means disposed in said housing downstream of said particulate trap for reducing noise emitted from said engine.

18. The improved emission control apparatus of claim 17 in which said noise reduction means includes a plurality of open ended tubular members the walls of which are perforated and the axes of which are parallel to the central axis of said cylindrical housing.

19. The improved emission control apparatus of claim 18 in which said noise reduction means includes a convex-concave partition separating the portion of said housing downstream of said particulate trap into a first chamber and a second chamber, said tubular members penetrating said convex-concave partition providing flow communication between said first and second chambers.

20. The improved emission control apparatus of claim 19 in which the convex side of said convex-concave partition faces upstream.

21. The improved emission control apparatus of claim 1 in which said upstream section of said particulate trap has peripheral walls which define the frustum of a cone and are provided with uniformly spaced longitudinally disposed, slotted apertures to impart centrifugal motion to said engine exhaust to aid in centrifugally forcing and trapping particulates in said annular pocket of said downstream section.

22. The improved emission control apparatus of claim 21 in which the slotted apertures of said upstream section are provided along one edge thereof with radially inwardly directed fins uniformly positioned to impart said centrifugal motion to said engine exhaust.

23. The improved emission control apparatus of claim 22 in which each of said fins is slanted, in the same direction, toward adjacent fins to aid in imparting said centrifugal motion to said engine exhaust.

* * * * *